United States Patent [19]

Peterson et al.

[11] Patent Number: 5,063,521
[45] Date of Patent: Nov. 5, 1991

[54] NEURAM: NEURAL NETWORK WITH RAM

[75] Inventors: William M. Peterson, Scottsdale; Christopher N. Hume, Mesa; Robert H. Leivian, Chandler, all of Ariz.

[73] Assignee: Motorola, Inc., Schaumburg, Ill.

[21] Appl. No.: 431,424

[22] Filed: Nov. 3, 1989

[51] Int. Cl.$^5$ .............................................. G06F 15/18
[52] U.S. Cl. ......................................... 395/27; 365/49
[58] Field of Search .................. 364/513, 807; 382/14, 382/15; 307/201; 340/146.3, 347 AD; 365/49

[56] References Cited

U.S. PATENT DOCUMENTS

| | | | |
|---|---|---|---|
| 3,609,686 | 9/1971 | Savory et al. | 340/146.3 |
| 4,327,354 | 4/1982 | Persoon | 340/146.3 |
| 4,439,756 | 3/1984 | Shenoi et al. | 340/347 AD |
| 4,755,974 | 7/1988 | Yamada et al. | 365/49 |
| 4,760,604 | 7/1988 | Cooper et al. | 382/15 |
| 4,941,122 | 7/1990 | Weideman | 364/807 |
| 4,958,375 | 9/1990 | Reilly et al. | 382/14 |

OTHER PUBLICATIONS

Loriferne, *Analog-Digital and Digital-Analog Conversion*, 1982, pp. 55–58.
Wilson et al., "Pattern-Recognition Properties of R.A.M./R.O.M. Arrays", *Electronics Letters*, Apr. 28, 1977, pp. 253–254.
Fairhurst et al., "A Classification System for Alpha-Numeric Characters Based on Learning Network Techniques", *Digital Processes*, 2 (1976), pp. 321–329.

*Primary Examiner*—Allen R. MacDonald
*Assistant Examiner*—Roger S. Joyner
*Attorney, Agent, or Firm*—Robert D. Atkins

[57] ABSTRACT

A random access memory (RAM) circuit is provided wherein an input signal matrix forming an identifiable original pattern is learned and stored such that a distorted facsimile thereof may be applied to generate an output signal matrix forming a replication of the original pattern having improved recognizable features over the distorted facsimile. The input signal matrix is logically divided into a plurality of predetermined subsets comprising a unique element of the input signal matrix and the elements in the neighborhood thereof. Each predetermined subset is quantized into a first digital address and applied at the address inputs of a memory circuit for retrieving data stored in the addressed memory location, while one signal of the predetermined subset is digitized and weighted and combined with the data retrieved from the addressed memory location for storage in the same addressed memory location. Next, a plurality of second digital addresses is generated including predetermined combinations of the first digital address perturbed at least one bit and sequentially applied at the address inputs of the memory circuit whereby the steps of digitizing and weighting one signal of the predetermined subset of the input signal matrix, combining the digitized and weighted signal with the data retrieved from the addressed memory location, and storing the combination back into the addressed memory location are repeated for the second digital addresses.

13 Claims, 3 Drawing Sheets

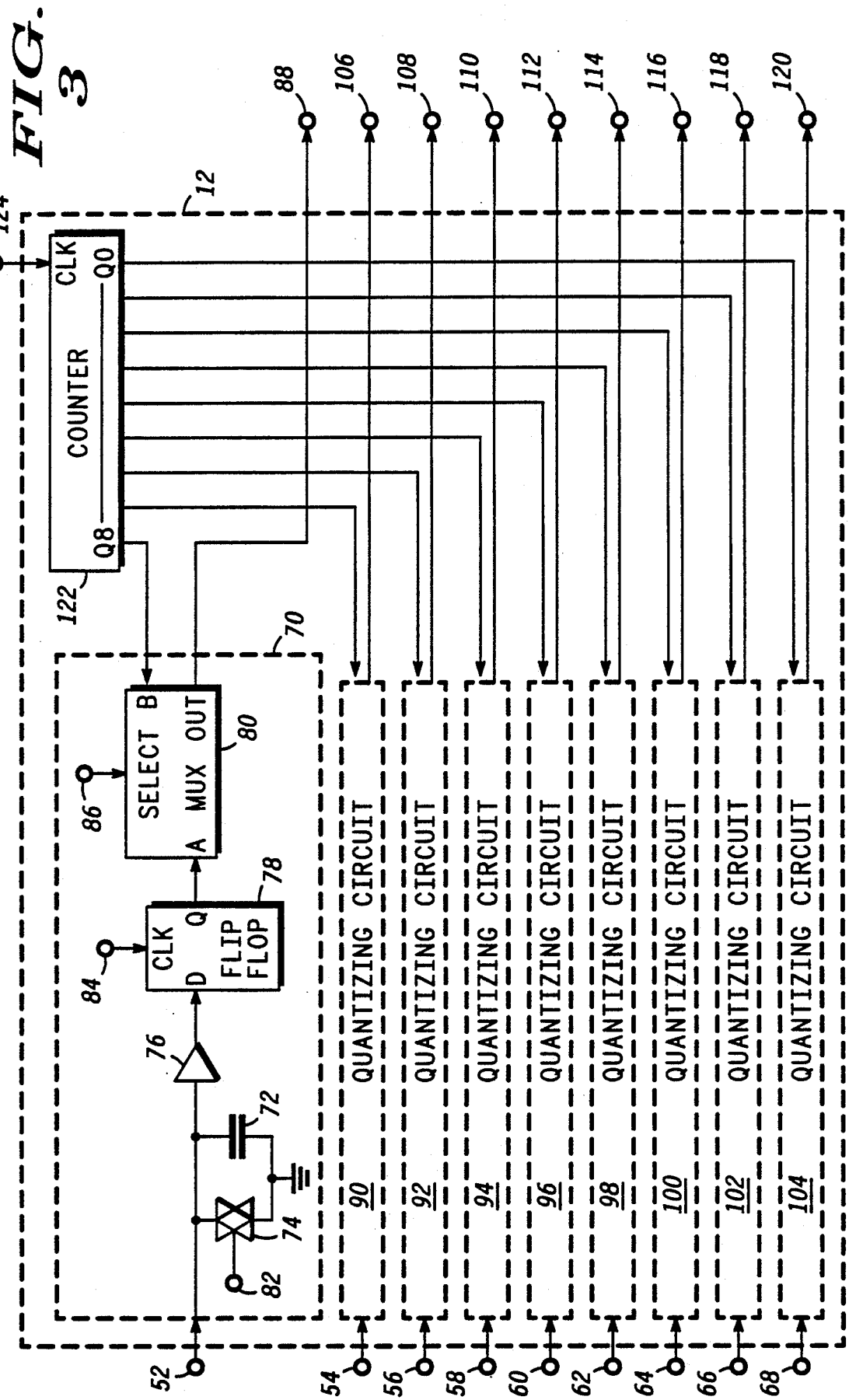

NEURAM: NEURAL NETWORK WITH RAM

BACKGROUND OF THE INVENTION

The present invention relates in general to neural networks, and more particularly, to a random access memory (RAM) circuit for emulating the learning and recognition behavior of neurons.

A biological neuron is a single nervous cell responsive to stimuli through weighted inputs known as synapses. The weighted stimuli are summed and processed through a particular non-linearity associated with the neuron for providing an output signal. The output of the neuron may then be connected to the synapse of the next level neuron forming an interconnection of neurons known as a neural network, the latter of which possesses certain desirable properties including the ability to learn and recognize information patterns in a parallel manner.

Technologists have long studied the advantageous nature of the biological neuron in an attempt to emulate its behavior in electronic circuitry. As indicated, some of the advantages of the neural network include the learning and recognition of patterns and shapes. The neural network may be taught a particular pattern and later be called upon to identify the pattern from a distorted facsimile of the same pattern. Unlike conventional signal processing techniques wherein the solution is programmed with a predetermined algorithm, the recognition technique of the neural network may be learned through an iterative process of adding random noise to the input signal of an ideal pattern, comparing the output signal of the neural network with the ideal pattern, and adjusting the synaptic weights to provide the correct response.

Another desirable feature of the neural network is its robust quality to a localized failure wherein the ability to recognize is simply degraded, typically in proportion to the extent of the failure. This feature is advantageous over conventional signal processing circuits wherein a single component failure may cause a complete system failure. Indeed, the neural network may include a feedback mechanism to alter the synaptic weights in undamaged paths to compensate for the damage and restore the operation of the system to the original level of performance. Furthermore, the neural network inherently processes information in parallel offering real-time execution without the classic von Neumann bottleneck associated with conventional serial processing techniques, i.e., digital signal processing and general microprocessor based applications. In general, neural networks are well suited for applications wherein the solution algorithm is not known or difficult to implement, or where conventional processing techniques are too slow. Notably, neural networks typically are not high precision devices, thus, a certain degree of error is generally present in the output signal.

Modern electronic circuits have achieved some degree of success in emulating the biological neuron. Previous examples of electronic neural networks comprise resistor arrays, floating gates and adaptive logic each of which possess one or more limitation. The resistive array is small and integrable into an integrated circuit (IC), but suffer from non-programmability prohibiting post learning as the system changes. The floating gates and adaptive logic are programmable, but typically offer low density limiting the number of neurons available for use.

Hence, there is a need for a circuit having neuron-like behavior in a high speed, high density package and combining the properties of learning and recognition with programmability whereby the knowledge base of the neural network may be updated.

SUMMARY OF THE INVENTION

Accordingly, it is an objective of the present invention to provide a circuit for emulating the behavior of a neuron.

A further objective of the present invention is to provide a circuit using RAM to emulate the behavior of a neuron.

Another objective of the present invention is to provide a RAM circuit for learning and storing an identifiable pattern.

Still another objective of the present invention is to provide a RAM circuit for recognizing a distorted facsimile of a known pattern and providing an improved replica of the known pattern at an output.

In accordance with the above and other objectives there is provided a circuit having a plurality of inputs coupled for receiving an input signal matrix forming an identifiable original pattern indicia wherein the original pattern indicia is learned and stored such that a distorted facsimile thereof may be applied to generate an output signal matrix forming a replication of the original pattern indicia having improved features over the distorted facsimile comprising, a plurality of learning circuits wherein one learning circuit includes, a first circuit for quantizing a predetermined subset of the input signal matrix into a first digital address, a second circuit coupled to the first circuit and responsive to a digital address control signal for sequentially generating a plurality of second digital addresses wherein the plurality of second digital addresses include the first digital address and predetermined combinations thereof perturbed by at least one bit, a memory circuit coupled to a data bus and being responsive to the plurality of second digital addresses for reading data from an addressed memory location and writing data to the addressed memory location, and a third circuit responsive to one signal of the predetermined subset of the input signal matrix for providing a digitized and weighted output signal which is then combined with the data read from the memory circuit wherein the combination of the digitized and weighted output signal and the data read from the memory circuit is applied at the data bus for storage back in the addressed memory location of the memory circuit; and a fourth circuit for applying the input signal matrix to the plurality of learning circuits.

In another aspect, the present invention comprising a plurality of recognition circuits wherein one recognition circuit includes, a first circuit for quantizing a predetermined subset of the input signal matrix into a first digital address; and a memory circuit coupled to a data bus and being responsive to the first digital addresses for reading data from an addressed memory location wherein the data read from the memory location is the expected value of one element of the input signal matrix.

BRIEF DESCRIPTION OF DRAWINGS

FIG. 3 is a simplified block diagram providing additional detail of one aspect of the present invention.

DETAILED DESCRIPTION OF THE PREFERRED EMBODIMENT

The preferred embodiment of the present invention is presented wherein a particular identifiable information pattern, represented as input signal $S_{ij}$, may be learned and stored in a memory circuit. A number of such patterns may be trained depending on the capacity of the memory circuit. Following the learning sequence, a distorted facsimile of the original pattern, i.e., another input signal $S_{ij}'$ corrupted in the presence of random noise, is applied to the memory circuit from which an output signal $R_{ij}$ is generated representing an identifiable replica of the original information pattern. The following discussion is directed toward this learning and recognition process.

Figure 1:
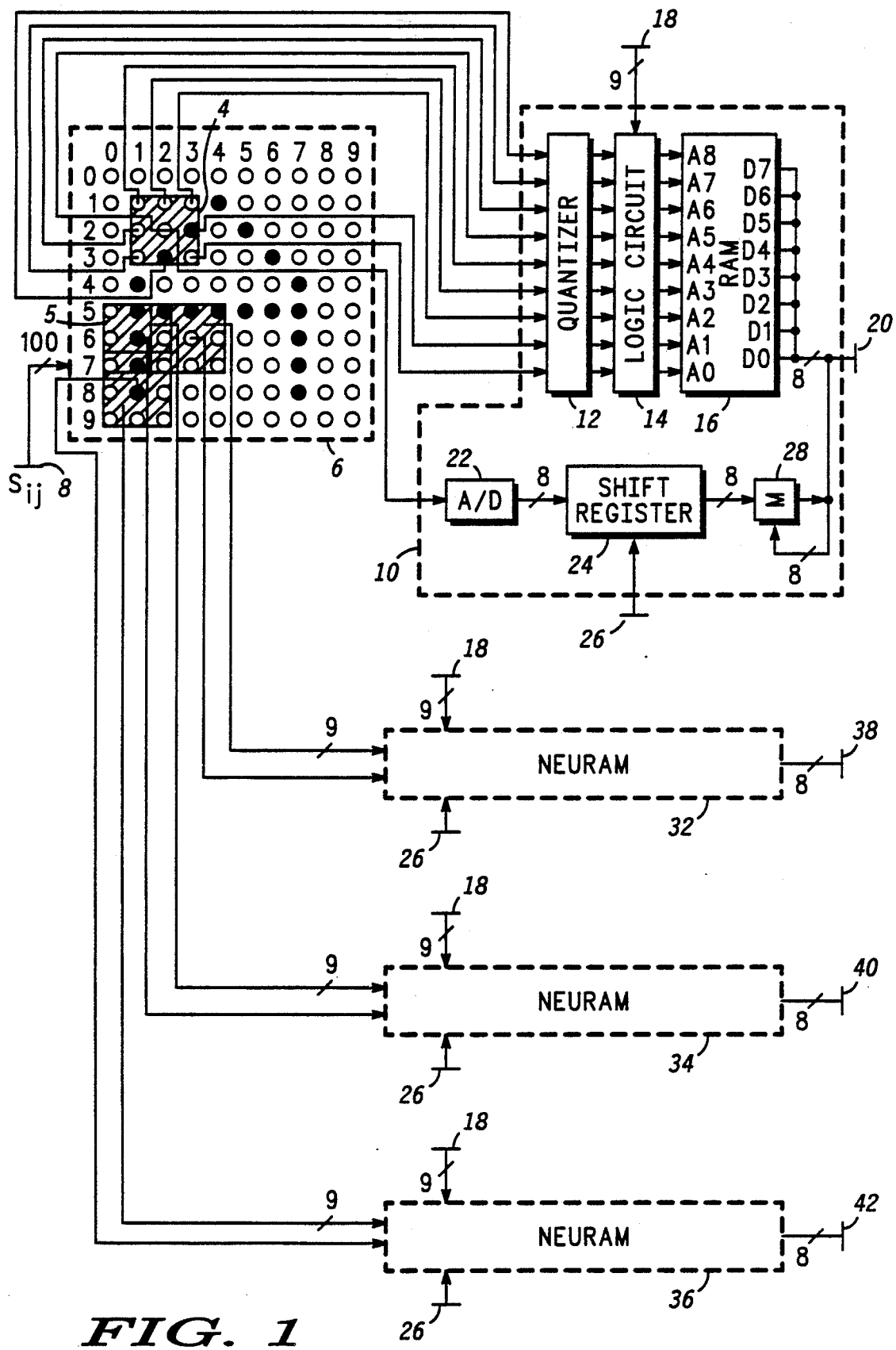
FIG. 1 is a simplified block diagram illustrating the preferred learning embodiment of the present invention.

Referring to FIG. 1, sensor field 6 includes 100 (10×10) pixels $P_{ij}$ having a one-to-one mapping to the elements of input signal $S_{ij}$ applied at input 8 for providing an image of the input pattern, wherein "i" and "j" are integers ranging from 0 to 9 representing the row and column indices, respectively. For example, pixel $P_{00}$ is responsive to input signal element $S_{00}$, pixel $P_{01}$ is responsive to input signal element $S_{01}$, and so on. In general, input signal $S_{ij}$ is an analog signal matrix having positive and negative values for controlling the intensity of pixels $P_{ij}$. For example, a zero value for one input signal element may produce a neural gray (mid scale) pixel intensity, while a range of positive values produce brighter intensities and a range of negative values produce dimmer intensities, through and including turning the pixel off.

The input signal $S_{ij}$ and, accordingly, pixels $P_{ij}$, are logically grouped into 64 three-by-three matrices, for example, one logical group 4 comprises pixels $P_{11}$, $P_{12}$, $P_{13}$, $P_{21}$, $P_{22}$, $P_{23}$, $P_{31}$, $P_{32}$ and $P_{33}$, and another logical group 5 comprises pixels $P_{50}$, $P_{51}$, $P_{52}$, $P_{60}$, $P_{62}$, $P_{70}$, $P_{71}$ and $P_{72}$. Pixel columns $P_{11}$-$P_{81}$, $P_{12}$-$P_{82}$, $P_{13}$-$P_{83}$, $P_{14}$-$P_{84}$, $P_{15}$-$P_{85}$, $P_{16}$-$P_{86}$, $P_{17}$-$P_{87}$ and $P_{18}$-$P_{88}$ occupy the center pixel in one each of the 64 logical groups. Each logical group then provides nine address signals, one for each pixel thereof, and one data signal from the center pixel. The pixels surrounding the perimeter of sensor field 6, rows $P_{00}$-$P_{09}$ and $P_{90}$-$P_{99}$ and columns $P_{00}$-$P_{90}$ and $P_{09}$-$P_{99}$, are shown to simplify the explanation of the origin of some address signals and need not physically exist. The elements of the input signal $S_{ij}$ associated with the perimeter pixels may be coupled to a source of low potential for providing a known reference signal for these address lines.

The output signals of each of the 64 logical pixel groups of sensor field 6 are coupled to respective neural RAM circuits (neuram), 64 in total, one of which is neuram 10, shown in FIG. 1. For example, logical pixel group 4 is responsive to input signal elements $S_{33}$, $S_{23}$, $S_{13}$, $S_{12}$, $S_{11}$, $S_{22}$, $S_{21}$, $S_{31}$ and $S_{32}$ and coupled to the inputs of quantizer circuit 12, the outputs of which are coupled through logic circuit 14 to A0–A8 address inputs of ram 16, respectively. Ram 16 contains 512 addressable memory locations. The mapping of the first logical group of input signal $S_{ij}$ to the address inputs may be random for the first neuram assignment, but should be consistent for all others. Quantizing circuit 12 is responsive the analog input signal elements for providing a digital output pattern to logic circuit 14, the latter of which comprises nine exclusive-OR gates each having a first input responsive to one bit of the digital output pattern of quantizing circuit 12 and a second input responsive to one address signal provided through address control bus 18. For example, the first and second inputs of the first exclusive-OR gate of logic circuit 14 may be coupled for receiving input signal element $S_{32}$ and the first address signal of address control bus 18, respectively. The outputs of the exclusive-OR gates are then coupled to A0–A8 address inputs of ram 16, respectively. Ram 16 also includes D0–D7 data input/output ports coupled to 8-bit data bus 20.

Center pixel, $P_{22}$, is additionally coupled to the input of analog-to-digital converter (ADC) 22 for providing an 8-bit output signal which is then applied at the first input of shift register 24. The second input of shift register 24 is coupled to data bus 26 at which weighting bits, $W_1$, are applied. The first and second inputs of summing circuit 28 are coupled to the output of shift register 24 and to data bus 20, respectively, while the output of the summing circuit 28 is also coupled to data bus 20. Likewise, the remaining 63 logical pixel groups are coupled to 63 neuram circuits; for example, pixels $P_{52}$, $P_{53}$, $P_{54}$, $P_{62}$, $P_{63}$, $P_{64}$, $P_{72}$, $P_{73}$ and $P_{74}$ are coupled to neuram 32, pixels $P_{50}$, $P_{51}$, $P_{52}$, $P_{60}$, $P_{61}$, $P_{62}$, $P_{70}$, $P_{71}$ and $P_{72}$ are coupled to neuram 34 and pixels $P_{70}$, $P_{71}$, $P_{72}$, $P_{80}$, $P_{81}$, $P_{82}$, $P_{90}$, $P_{91}$ and $P_{92}$ are coupled to neuram 36, respectively, as shown in FIG. 1. Neurams 32, 34 and 36 include the identical components as described for neuram 10; each being responsive to nine address signals and one data signal from the respective logical pixel group and the address signals of address control bus 18 for providing output signals at data busses 38, 40 and 42, respectively.

The following discussion encompasses the learning sequence of neuram 10. A microprocessor circuit, not shown, or the equivalent provides various control and data signals, i.e., the address signals at address control bus 18 and the weighting bits on data bus 26, necessary for the logistics of the overall operation of the present invention. The details of interfacing a microprocessor circuit to the aforedescribed components such as logic circuit 14, ram 16 and shift register 24 is understood. The learning sequence may begin with the initialization to zero, or other small, signed values randomly distributed about zero, of the memory locations of ram 16 of all 64 neuram circuits. However, in subsequent learning sequences, the contents of ram 16 are typically increased and decreased in proportion to the value of the respective element of input signal $S_{ij}$. The input signal $S_{ij}$ is initialized to a pattern, for example, the letter "A" wherein the input signal column elements $S_{41}$-$S_{81}$ and $S_{47}$-$S_{87}$, row elements $S_{51}$-$S_{57}$, and individual elements $S_{32}$, $S_{23}$, $S_{14}$, $S_{25}$ and $S_{36}$ are positive values and all others are negative values, as shown in FIG. 1. The outputs of quantizing circuit 12 provide a binary one for the positive values and a binary zero for the negative values of the input signal elements $S_{33}$, $S_{23}$, $S_{13}$, $S_{12}$, $S_{11}$, $S_{22}$, $S_{21}$, $S_{31}$ and $S_{32}$, 010000001, respectively. The address signals provided through address control bus 18 are initially set to binary zero allowing the binary values of the output signals of quantizing circuit 12 to pass though logic circuit 14 to address inputs A0–A8 of ram 16.

Input signal element $S_{22}$ is also applied to ADC 22 for developing a signed 8-bit word representative of the level of the input signal, for example, a zero level produces a zero 8-bit word, a positive value produces a positive 8-bit word and a negative value produces a negative 8-bit word, typically in two's complement notation. The 8-bit output signal of ADC 22 is applied at the first input of shift register 24, while first weighting bits, $W_1$, are applied at the second input via data bus 26 for shifting the 8-bit output signal one bit toward least significant position thereby effectively weighting the 8-bit output signal through a divide by 2 operation. The weighted 8-bit output signal is then applied at the first input of summing circuit 28. Meanwhile, the addressed contents of ram 16 is placed on data bus 20 and applied at the second input of summing circuit 28. The sum of these signals, or difference if the 8-bit output signal is two's complement, is stored internally until the microprocessor redirects the input/output ports D0-D7 of ram 16 to store the output signals of summing circuit 28 into the same addressed location, 010000001. Notably, summing circuit 28 does not roll around if the sum exceeds the 8-bit capacity of the data bus, but rather holds at the maximum positive or negative value. The aforedescribed process is performed simultaneously for all 64 neurams whereby the digitized, weighted value of every center pixel of sensor field 6 is stored in one 8-bit memory location thereof, which may be equivalently described in the following read-modify-write operation:

$$WriteData = ReadData + W*ADC(CenterPixel) \quad (1)$$

where: ReadData is the 8-bit digital word read from the addressed memory location.

W is a predetermined weighting factor, e.g., ½.

ADC() is a function for performing the analog-to-digital (8-bit) conversion of the argument.

CenterPixel is the level of the input signal element associated with the center pixel of the logic group.

WriteData is the 8-bit digital word stored in the same addressed memory location following the operation.

The aforedescribed read-modify-write operation is now repeated with the first address signal of address control bus 18 inverted to a binary one, while the binary pattern from the output of quantizing circuit 12 remains at 010000001. Consequently, the first output signal of logic circuit 14, applied to A8 address input of ram 16, is inverted to a binary zero due to the exclusive-OR operation, thereby providing a perturbed address of 010000000 to A0-A8 address inputs of ram 16. This address is known as a Hamming distance of one from the original address wherein one bit (A8 bit) is complemented. The level of input signal element $S_{22}$ is unchanged; however, a second weighting bit pattern, $W_2$, is applied to data bus 26 whereby the 8-bit output signal of ADC 22 is shift by two bits, or equivalently divide by 4. The 8-bit output signal of shift register 24 is applied at the first input of summing circuit 28, while the newly addressed contents of ram 16 is placed on data bus 20 and applied at the second input of summing circuit 28. The sum of these signals is then stored back in the perturbed address location 010000000.

Next, the first address signal of address control bus 18 is returned to its original value of binary zero and the second address signal is inverted to a binary one causing the second output signal of logic circuit 14, applied to A7 address input of ram 16, to invert to a binary one for providing a perturbed address of 010000011 to A0-A8 address inputs of ram 16. This is another address of Hamming distance one from the original address wherein the A7 address bit is complemented. The read-modify-write operation is repeated again with weighting bits $W_2$ applied at data bus 26 and the result is stored in the perturbed address location 010000011. The process continues for the third through the ninth address lines of address control bus 18 wherein the 8-bit digitized and weighted input signal element $S_{22}$ is stored in ten unique memory locations of ram 16; one from the original address and nine from perturbations of original address by a Hamming distance of one (010000000, 010000011, 010000101, 010001001, 010010001, 010100001, 011000001, 000000001, 110000001). Likewise, each of the other 63 neurams simultaneously store the weighted and digitized input signal element corresponding to the center pixel of each of the other 63 logical groups into the corresponding ten memory locations.

The learning process continues for the letter "A" wherein the original address is sequentially perturbed by a Hamming distance of two (complementing two address bits), while a third weighting bit pattern, $W_3$, shifts the 8-bit output signal of ADC 22 by three bits (divide by 8). For example, the first and second address signals of address control bus 18 are inverted to a binary one, while the binary pattern of the output signals of quantizing circuit 12 remains at its original value of 01000001. The first and second output signals of logic circuit 14 are then inverted to binary one and zero, respectively, and a perturbed address of 010000010 is applied at A0-A8 address inputs. The digitized and weighted input signal element $S_{22}$ is summed with the addressed contents of ram 16, and the result is then stored back in the same perturbed address location 010000010.

Next, the second address signal is returned to a value of binary zero, and the third address signal is then inverted to a binary one causing the first and third output signals of logic circuit 14 to inverted to binary zero and one, respectively, for providing a perturbed address of 010000100 applied at A0-A8 address inputs. The read-modify-write operation is processed with weighting signal $W_3$ and the result is stored in the perturbed address location 010000100. The process continues for all 64 neurams and for all combination of address perturbation of Hamming distance two whereby the results of the read-modify-write operations are stored in the corresponding memory locations. This process may continue for Hamming distances of three through nine with correspondingly smaller weights (1/16, 1/32, etc.) for each level; however, additional recognition information rapidly diminishes at each increasing level. Typically, completing the sequence through Hamming distance two or three is sufficient for most recognition patterns in presence of the random noise. Completing the sequence through Hamming distance four or more would not necessarily provide a noticeable increase in recognition capability of the neurams.

The aforedescribed learning process provided the training for input signal $S_{ij}$ represented as the letter "A" in sensor field 6. The entire training sequence may be repeated, less the initialization of ram 16 to zero, for another input signal $S_{ij}$ representing say the letter "B", and again for the letter "C", and so on through the conclusion of the training at which time ADC 22, shift register 24 (weighting factor by n) and summing circuit 28 are disabled.

In another embodiment, not shown, the read-modify-write operation may be performed through the microprocessor eliminating the need for shift register 24 and summing circuit 28. For this option, the output of ADC 22 and D0-D7 input/outputs of ram 16 are coupled to the data bus of the microprocessor permitting the latter to read the addressed contents of ram 16, read the output of ADC 22, perform the read-modify-write operation of Equation (1) and store the result back in ram 16. This process is repeated for all address perturbation of Hamming distance one, two, etc. Again, at the conclusion of the training, ADC 22 is no longer needed.

Figure 2:
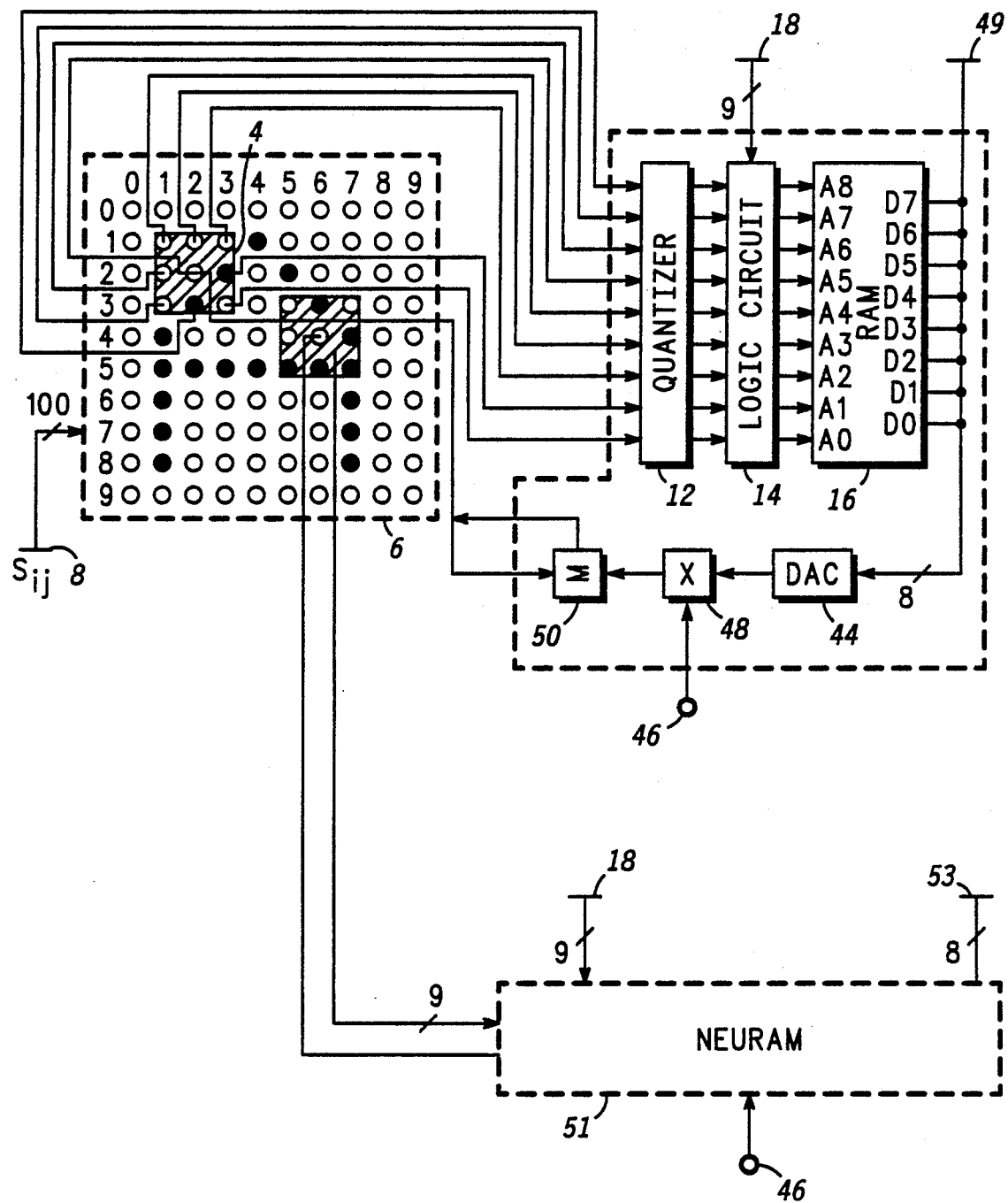
FIG. 2 is a simplified block diagram illustrating the preferred recognition embodiment of the present invention.

Turning to the recognition process, a particular input signal $S_{ij}$ again representing say the letter "A" is provided only this time input signal $S_{ij}$ is distorted in the presence of noise, i.e., certain elements thereof are at levels not identifiable with the letter "A". Referring to FIG. 2, input signal $S_{ij}$ is applied at input 8. The components of FIG. 2 having a similar function are given the same reference number used FIG. 1. The input signal elements of logic pixel group 4 are applied to quantizing circuit 12, while the address signals of address control bus 18 are set to binary zero allowing the binary pattern provided at the output of quantizing circuit 12 to pass though logic circuit 14 unperturbed to address input A0-A8 of ram 16. The contents of the addressed memory location is placed on data bus 20 for providing the level of one element of output signal $R_{ij}$. Likewise, the other 63 neurams, i.e. neuram 51, simultaneously provide respective elements of the output signal $R_{ij}$ wherein the resulting array of output signals $R_{ij}$ is an improved replica of the ideal pattern of the letter "A". In a digital sense, the determination of on or off for the pixel driven by one element of output signal $R_{ij}$ may be selected as one of the output bits, typically the most significant bit.

Further improvements for the recognition sequence is shown in FIG. 2. The D0-D7 outputs of ram 16 are coupled to digital-to-analog converter (DAC) 44 for providing an analog output signal in response thereto. The output signal of DAC 44 is coupled to the first input of multiplier 46, and the second input of multiplier 46 is coupled to input terminal 48 at which is applied a weight signal for the analog output signal of DAC 44 wherein the value of the weighting signal is selected such that the analog signal is reduced, typically by a factor of 4. The output of multiplier 46 is coupled to the first input of summing circuit 50, while the second input of the same is coupled for receiving input signal element $S_{22}$. The output of summing circuit 50 is also coupled to the second input thereof. This operation may be equivalently described as:

$$NewSignal = OldSignal + W*DAC(RamData) \quad (2)$$

where: RamData is the 8-bit digital word read from the addressed memory location.

W is a predetermined weighting factor, e.g., ¼.

DAC() is a function for performing the digital-to-analog conversion of the argument.

OldSignal is the level of the input signal element associated with the center pixel of the logic group.

NewSignal is the updated level reapplied to the center pixel of the logic group following the operation.

Hence, the output signal of ram 16 is converted to an analog signal, weighted and summing with the original value of center pixel associated with the neuram. All 64 neurams perform this sequence simultaneously whereby all of the elements input signal $S_{ij}$ are updated to a new input signal $S_{ij}'$ and the original input signal $S_{ij}$ is removed. One logical group of input signal $S_{ij}'$ is then applied through quantizing circuit 12 and logic circuit 14 to the A0-A8 address inputs and the resulting data provided at the output of ram 16 is a further improvement in the replication of the originally trained pattern. This loop may continue though progressive smaller improvements in the output signal $R_{ij}$ until the values approach a limit, or after predetermined number of cycles, at which time maximum recognition is completed. Notably, the terminal output signal $R_{ij}$ may not be identifiable if the input signal $S_{ij}$ is significantly different from any trained pattern.

Most if not all memory locations of ram 16 are read, modified and re-written according to Equation (1) for each input signal $S_{ij}$ taught to the system. Thus, the contents of a memory location of a neuram increases and decreases with each training cycle, depending on the level of the input signal elements. The resultant value stored in each memory location is the expected value of the level of element of the input signal $S_{ij}$ associated with the center pixel of the logic group in question, given the address from the neighboring pixels since the value of the center pixel for that element of input signal $S_{ij}$ has been stored in the address locations perturbed about the original address. The value in the memory location provides one element of the output signal $R_{ij}$, and the combination of the addressed memory locations of all 64 neurams provides the complete output signal $R_{ij}$. Thus, it is possible to retrieve the information pattern from a distorted facsimile of the original pattern.

Referring to FIG. 3, quantizing circuit 12 is shown in greater detail comprising nine separate circuits, one for each element of the nine pixel logical group for providing a plurality of binary (0 or 1) output signals, each representative of a quantized time average of the respective time variant input signal. For example, input signal elements $S_{33}$, $S_{23}$, $S_{13}$, $S_{12}$, $S_{11}$, $S_{22}$, $S_{21}$, $S_{31}$ and $S_{32}$ may be applied at input terminals 52, 54, 56, 58, 60, 62, 64, 66 and 68 of quantizing circuit 12, respectively. Input terminal 52 is coupled to circuit 70 which comprises capacitor 72, switch 74, threshold detector 76, D-type flipflop 78 and multiplexer 80. The first terminal of capacitor 72 is coupled to input 52, while the second terminal of the same is coupled to a first source of operating potential typically operating at ground potential. The conduction path of switch 74 is coupled in parallel with capacitor 72 and is rendered conductive upon receiving an enable signal at the control input 82. Threshold detector 76 is then coupled between input 52 and the data input of D-type flipflop 78, the latter of which is responsive to a clock signal applied at input terminal 84 for sampling the applied input signal. One input of multiplexer 80 is responsive to a first state of a select signal applied at input terminal 86 for routing the output signal of D-type flipflop 78 applied at input A to the output thereof and to a second state of the select signal for routing the signal applied at input B to the same output. The output of multiplexer 80 is coupled to output 88. Circuits 90, 92, 94, 96, 98, 100, 102 and 104 are coupled between inputs 54-68 and outputs 106-120, respectively, wherein each of these circuits comprise the same components as circuit 70. Outputs 106-120 are then coupled to inputs of logic circuit 14. In addition, the outputs of binary counter 122 are coupled to circuits 70 and 90-104 at input B of multiplexer 80, while input CLK of binary counter 122 is coupled to input terminal 124.

The operation of quantizing circuit 70 is cyclic as determined by the frequency of the enable signal applied at input terminal 82 that is the control input of switch 74. At the beginning of the cycle, the conduction path of switch 74 is closed discharging capacitor 72, thereby removing any previously stored information. During the cycle, the voltage developed across capacitor 72 is proportional to the magnitude of the time variant signal applied at input 52 allowing the potential developed thereacross to fluctuate until at a predetermined time near the end of the cycle D-type flipflop 78 receives a clock pulse and the output signal of threshold detector 76 is sampled. Typically, the signal applied at input 52 predominantly positive or negative during the cycle thereby providing a clear decision at the output of threshold detector 76. Hence, the signal applied at input 52 is time averaged over the cycle through the time constant of capacitor 72, quantized above or below the predetermined boundary of threshold detector 76 and sampled by D-type flipflop 78.

If the select signal is at the first state, then the output signal of D-type flipflop 78 is routed through multiplexer 80 to output 88. Otherwise, one of the output signals of binary counter 122 is provided at output 88 and applied at the first input of logic circuit 14. Binary counter 122 is used primarily in learning mode wherein the output signals rotate through all addressable memory locations of ram 16 so that the pre-calculated data of the composite training sequence may be inserted therein. Again, the microprocessor plays a predominate role in controlling binary counter 122 and performing the precalculation of all known patterns into composite data, according to the read-modify-write operation of Equation (1). The clock signal applied at input 124 determines the addressing rate of binary counter 122.

Hence, what has been provided is a novel technique of utilizing a RAM circuit to learn various patterns and then, in response to a distorted facsimile of the original pattern, provide an improved replication of the original pattern.

We claim:

1. A method of storing an input signal matrix comprising the steps of:
   quantizing the input signal matrix into a first digital address;
   generating a plurality of second digital addresses from a logical combination of said first digital address and a digital address control signal, said plurality of second digital addresses including said first digital address and predetermined variations of said first digital address perturbed by at least one bit;
   addressing a memory circuit with said plurality of second digital addresses for retrieving data stored in an addressable memory location thereof;
   converting one signal of the input signal matrix to a digital output signal;
   weighting said digital output signal according to a weight signal for providing a weighted digital output signal; and
   summing said weighted digital output signal with said data retrieved from said addressable memory location for storage back in said addressable memory location of said memory circuit.

2. A method of providing a replication of an original input signal matrix from a distorted input signal matrix comprising the steps of:
   quantizing the distorted input signal matrix into a first digital address;
   addressing a memory circuit with said first digital address for retrieving data stored in an addressable memory location wherein said retrieved data is the expected value of one element of the original input signal matrix;
   converting said data retrieved from said addressable memory location to an analog output signal;
   weighting said analog output signal in accordance with a weight signal for providing a weighted analog output signal; and
   summing one signal of the distorted input signal matrix with said weighted analog output signal for providing an element of the replication of the original input signal matrix.

3. An apparatus for storing an input signal matrix applied at a plurality of inputs thereof, comprising:
   first means coupled to the plurality of inputs of the apparatus for receiving and quantizing the input signal matrix into a first digital address at an output;
   second means having an input coupled to said output of said first means and responsive to a digital address control signal for sequentially generating a plurality of second digital addresses at an output from said first digital address, said plurality of second digital addresses including said first digital address and predetermined variations thereof perturbed by at least one bit;
   memory means having an address input coupled to said output of said second means for receiving said plurality of second digital addresses and having a data port coupled for reading data from an addressable memory location within said memory means and writing data to said addressable memory location within said memory means;
   third means having an input coupled to one of the plurality of inputs of the apparatus for receiving a first signal of the input signal matrix and providing a digital output signal at an output;
   fourth means coupled to said output of said third means for receiving said digital output signal of said third means and responsive to a weight signal for providing a weighted digital output signal; and
   fifth means for summing said weighted digital output signal as applied at a first input with said data read from said addressable memory location as applied at a second input from said data port of said memory means, said fifth means having an output coupled to said data port of said memory means for providing said data written to said addressable memory location.

4. The apparatus of claim 3 wherein said first means comprises a plurality of quantizing circuits each having an input coupled to one of the plurality of inputs of the apparatus for receiving one signal from the input signal matrix, each quantizing circuit including:
   threshold detecting means having an input coupled to the input of the quantizing circuit for receiving the one signal of the input signal matrix and having an output for providing a first bit of said first digital address, said first bit of said first digital address having a first binary value when a time average of the first signal is greater than a predetermined threshold and a second binary value when said time average of the signal is less than said predetermined threshold;

capacitive means coupled between said input of threshold detecting means and a power supply conductor for storing the one signal of the input signal matrix;

switching means coupled in parallel with said capacitive means and responsive to a switch control signal for discharging the potential developed thereacross; and sampling means having a first input coupled to said output of said threshold detecting means for latching said first bit of said first address at an output upon receiving a clock signal at a second input.

5. The apparatus of claim 4 wherein said second means comprises a plurality of exclusive-OR gates each having first and second inputs and having an output, said first inputs being coupled for receiving said first digital address from said first means, said second inputs being coupled for receiving said digital address control signal, said outputs providing said plurality of second digital addresses to said address inputs of said memory means.

6. The apparatus of claim 5 wherein said third means comprises an analog-to-digital converter responsive to said first signal of the input signal matrix for providing said digital output signal.

7. The apparatus of claim 6 wherein said fourth means comprises a digital shift register coupled for receiving said digital output signal of said analog-to-digital converter and responsive to said weight signal for shifting said digital output signal a predetermined number of bits for providing said weighted digital output signal at an output.

8. The apparatus of claim 7 wherein said fifth means comprises a summing circuit having first and second inputs, said first input being coupled to said output of said digital shift register, said second input being coupled to said data port of said memory means for summing said weighted digital output signal with said data read from said memory means for application back to said data port for storage in said addressable memory location of said memory means.

9. An apparatus having a plurality of inputs coupled for receiving an input signal matrix, comprising:

first means coupled to the plurality of inputs of the apparatus for receiving and quantizing the input signal matrix into a first digital address at an output;

memory means having an address input coupled to said output of said first means for receiving said first digital address and having a data port coupled for reading data from an addressable memory location within said memory means;

second means having an input coupled to said data port of said memory means for converting said data read from said addressable memory location to an analog output signal at an output;

third means coupled to said output of said second means for receiving said analog output signal of said second means and responsive to a weight signal for providing a weighted analog output signal at an output; and fourth means for summing said weighted analog output signal from said output of said third means as applied at a first input and a first signal of the input signal matrix from one of the plurality of inputs of the apparatus as applied at a second input for generating an updated first signal of the input signal matrix having reduced distortion.

10. The apparatus of claim 9 wherein said first means comprises a plurality of quantizing circuits each having an input coupled to one of the plurality of inputs of the apparatus for receiving one signal from the input signal matrix, each quantizing circuit including:

threshold detecting means having an input coupled to the input of the quantizing circuit for receiving the one signal of the input signal matrix and having an output for providing a first bit of said first digital address, said first bit of said first digital address having a first binary value when a time average of the first signal is greater than a predetermined threshold and a second binary value when said time average of the signal is less than said predetermined threshold;

capacitive means coupled between said input of threshold detecting means and a power supply conductor for storing the one signal of the input signal matrix;

switching means coupled in parallel with said capacitive means and responsive to a switch control signal for discharging the potential developed thereacross; and sampling means having a first input coupled to said output of said threshold detecting means for latching said first bit of said first address at an output upon receiving a clock signal at a second input.

11. The apparatus of claim 10 wherein said second means comprises an digital-to-analog converter coupled to said data port of said memory means for providing said analog output signal at an output.

12. The apparatus of claim 11 wherein said third means comprises a multiplier circuit coupled to said output of said digital-to-analog converter and responsive to said weight signal for providing said weighted analog output signal at an output.

13. The apparatus of claim 12 wherein said fourth means comprises a summing circuit having first and second inputs, said first input being coupled to said output of said multiplier circuit, said second input being coupled to said one of the plurality of inputs of the apparatus for summing said weighted analog output signal of said multiplier circuit with said first signal of the input signal matrix for providing said updated first signal of the input signal matrix having reduced distortion.

* * * * *